United States Patent
Chen (10) Patent No.: US 12,307,774 B2
(45) Date of Patent: May 20, 2025

(54) CREWLESS AIRCRAFT AND CONTROL METHOD

(71) Applicant: SONY GROUP CORPORATION, Tokyo (JP)

(72) Inventor: Xi Chen, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 205 days.

(21) Appl. No.: 17/753,641

(22) PCT Filed: Sep. 7, 2020

(86) PCT No.: PCT/JP2020/033790
§ 371 (c)(1),
(2) Date: Mar. 10, 2022

(87) PCT Pub. No.: WO2021/054178
PCT Pub. Date: Mar. 25, 2021

(65) Prior Publication Data
US 2024/0046648 A1    Feb. 8, 2024

(30) Foreign Application Priority Data

Sep. 18, 2019  (JP) .................................. 2019-169095

(51) Int. Cl.
*G06V 20/52*    (2022.01)
*B64U 10/13*    (2023.01)
(Continued)

(52) U.S. Cl.
CPC ............. *G06V 20/52* (2022.01); *B64U 10/13* (2023.01); *G05D 1/12* (2013.01); *B64U 2101/30* (2023.01); *G06V 2201/07* (2022.01)

(58) Field of Classification Search
CPC .. H04K 3/45; H04K 3/92; H04K 3/65; G08G 5/006; G08G 5/0069
See application file for complete search history.

(56) References Cited

U.S. PATENT DOCUMENTS 9,193,458 B2 * 11/2015 Pongratz ................. B64C 37/02
9,689,976 B2 * 6/2017 Parker ....................... G01S 7/38
(Continued)

FOREIGN PATENT DOCUMENTS

JP    2005-199403 A    7/2005
JP    2017-056903 A    3/2017
(Continued)

OTHER PUBLICATIONS

International Search Report and Written Opinion of PCT Application No. PCT/JP2020/033790, issued on Nov. 17, 2020, 12 pages of ISRWO.

*Primary Examiner* — Yosef Kassa
(74) *Attorney, Agent, or Firm* — CHIP LAW GROUP (57) ABSTRACT

The present disclosure relates to a crewless aircraft that enable safe interaction with a recognition target. The crewless aircraft includes a state estimation unit that estimates, based on at least one of a camera image shot of the recognition target by a camera or a drive signal of a motor for a flying operation, a state of the recognition target, and an action determination unit that determines an action of the crewless aircraft based on the estimated state of the recognition target.

17 Claims, 10 Drawing Sheets

(51) Int. Cl.
    *G05D 1/00*          (2024.01)
    *B64U 101/30*     (2023.01)

(56)           References Cited

U.S. PATENT DOCUMENTS

| | | | | |
|---|---|---|---|---|
| 9,715,009 | B1* | 7/2017 | Parker | F41H 13/0075 |
| 9,758,246 | B1* | 9/2017 | Lema | G06V 20/13 |
| 9,798,325 | B2* | 10/2017 | Levien | G05D 1/005 |
| 9,846,915 | B2* | 12/2017 | Howe | G06T 7/11 |
| 9,989,965 | B2* | 6/2018 | Cuban | G05D 1/0202 |
| 10,133,932 | B2* | 11/2018 | Sato | G06V 40/20 |
| 10,809,712 | B1* | 10/2020 | Schaffalitzky | G05D 1/0022 |
| 2017/0369168 | A1 | 12/2017 | Hwang et al. | |
| 2019/0080620 | A1 | 3/2019 | Sugaya | |
| 2019/0225336 | A1 | 7/2019 | Myslinski | |

FOREIGN PATENT DOCUMENTS

| | | |
|---|---|---|
| WO | 2017/208355 A1 | 12/2017 |
| WO | 2019/168047 A1 | 9/2019 |

\* cited by examiner

CREWLESS AIRCRAFT AND CONTROL METHOD

CROSS REFERENCE TO RELATED APPLICATIONS

This application is a U.S. National Phase of International Patent Application No. PCT/JP2020/033790 filed on Sep. 7, 2020, which claims priority benefit of Japanese Patent Application No. JP 2019-169095 filed in the Japan Patent Office on Sep. 18, 2019. Each of the above-referenced applications is hereby incorporated herein by reference in its entirety.

TECHNICAL FIELD

The present disclosure relates to a crewless aircraft, a control method, and a program, and particularly relates to a crewless aircraft, a control method, and a program that enable safe interaction with a recognition target.

BACKGROUND ART

There are conventional techniques that enable a drone to measure a distance to and track a recognition target, shoot an image of a subject serving as a recognition target and analyze the image, and the like.

PTL 1 discloses a technique that extracts a time-series feature pertaining to a recognition target from time-series sensor information, and estimates an emotion of the recognition target on the basis of the time-series feature, taking into account the context of the sensor information.

According to the technique in PTL 1, the emotion is estimated taking into account the context of the sensor information, and thus the state of the emotion of the recognition target can be estimated in a stable manner without including error in the estimation result based on features extracted from instantaneous sensor information.

CITATION LIST

Patent Literature

PTL 1

JP 2005-199403 A

SUMMARY

Technical Problem

Incidentally, there have been situations where, depending on the state of an animal, a person, or the like that is the recognition target, the drone cannot interact with the recognition target safely. For example, it is dangerous for a drone to enter into an interaction in a state such as where an animal that is the recognition target attacks the drone.

Having been conceived of in light of such situations, the present disclosure makes it possible to safely interact with a recognition target.

Solution to Problem

A crewless aircraft of the present disclosure is a crewless aircraft including: a state estimation unit that, on the basis of at least one of a camera image shot of a recognition target by a camera or a drive signal of a motor for flying, estimates a state of the recognition target; and an action determination unit that determines an action of the crewless aircraft according to the state of the recognition target estimated.

A control method of the present disclosure is a control method including: a crewless aircraft estimating, on the basis of at least one of a camera image shot of a recognition target by a camera or a drive signal of a motor for flying, a state of the recognition target; and the crewless aircraft determining an action of the crewless aircraft according to the state of the recognition target estimated.

A program of the present disclosure is a program for causing a computer to execute processing of estimating, on the basis of at least one of a camera image shot of a recognition target by a camera or a drive signal of a motor for flying, a state of the recognition target; and determining an action of a crewless aircraft according to the state of the recognition target estimated.

In the present disclosure, the state of a recognition target is estimated on the basis of at least one of a camera image shot of a recognition target by a camera or a drive signal of a motor for flying, and action of a crewless aircraft is then determined according to the state of the recognition target estimated.

DESCRIPTION OF EMBODIMENTS

Modes for carrying out the present disclosure (called "embodiments" hereinafter) will be described hereinafter. The descriptions will be given in the following order.

1. Conventional Issue and Overview of Technique According to Present Disclosure
2. Configuration of Drone
3. Flight Control of Drone
3-1. State Estimation of Recognition Target
3-2. Action Determination

1. Conventional Issue and Overview of Technique According to Present Disclosure (Conventional Issue)

Figure 1A:
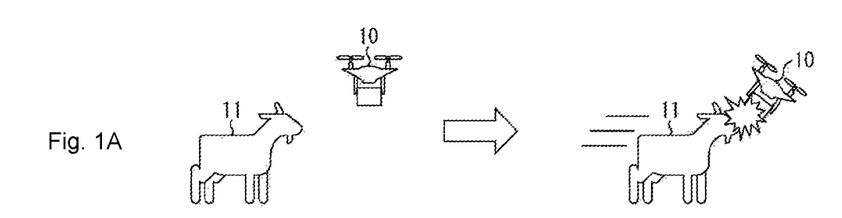
FIGS. 1A, 1B and 1C are diagrams illustrating a conventional issue.
Figure 1B:
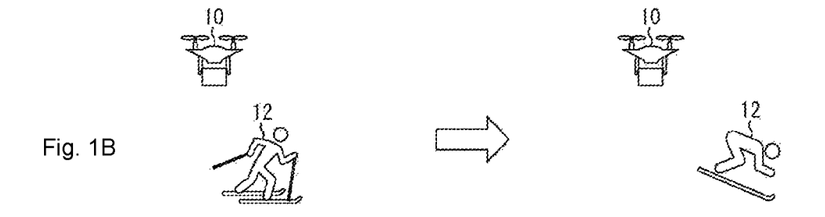
Figure 1C:
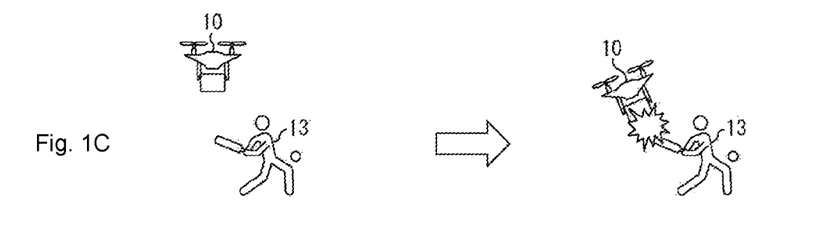

FIGS. 1A, 1B and 1C are diagrams illustrating a conventional issue in a case where a drone interacts with a recognition target.

For example, if the recognition target is a wild animal, interaction with the recognition target includes luring the animal, driving the animal away, shooting pictures of the animal for monitoring and observation, and the like. Meanwhile, if the recognition target is a person, interaction with the recognition target includes shooting images while following the recognition target or at close-range, such as during sports or live events.

For example, FIG. 1A illustrates an example in which a drone 10 is shooting an image of an animal 11, which is the recognition target. However, depending on the state of the animal 11, there is a risk of the drone 10 being attacked by the animal 11, as indicated on the right side of FIG. 1A.

FIG. 1B illustrates an example in which the drone 10 is shooting an image of a skier 12, who is the recognition target, while following the skier 12. However, depending on the state of the skier 12, the drone 10 may miss shooting the moment when the skier 12 jumps, for example, as indicated on the right side of FIG. 1B.

FIG. 1C illustrates an example in which a drone 10 is shooting an image of a baseball player 13, which is the recognition target, at close range. However, depending on the state of the baseball player 13, there is a risk that the drone 10 will collide with the bat swung by the baseball player 13, as indicated on the right side of FIG. 1C.

(Overview of Technique According to Present Disclosure)

Figure 2A:
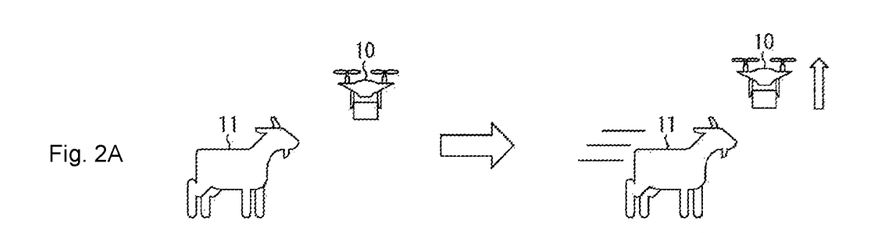
FIGS. 2A, 2B and 2C are diagrams illustrating an overview of a technique according to the present disclosure.
Figure 2B:
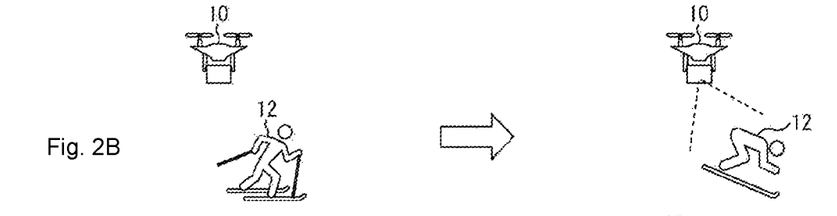
Figure 2C:
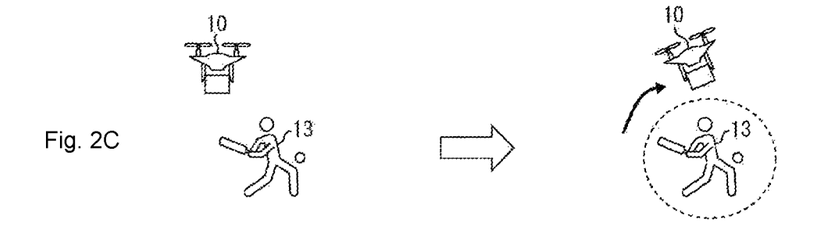

FIGS. 2A, 2B and 2C are diagrams illustrating an overview of the technique according to the present disclosure. Like FIGS. 1A, 1B, 1C, 2A, 2B, and FIG. 2C illustrates an example of the drone 10 interacting with a recognition target.

For example, in a state where the animal 11 will attack the drone 10, the drone 10 can avoid the attack from the animal 11 by ascending, as indicated in FIG. 2A.

Additionally, in a state where the skier 12 will jump, the drone 10 can avoid missing the shooting of the moment the skier 12 jumps by following the skier 12, as indicated in FIG. 2B.

Furthermore, in a state where the baseball player 13 swings a bat, the drone 10 can avoid colliding with the bat of the baseball player 13 by flying to a safe area where there will be no collision with the bat of the baseball player 13, as indicated in FIG. 2C.

The drone, which serves as a crewless aircraft according to an embodiment of the present disclosure, can estimate the state of the recognition target and determine its own action in accordance with that state.

Figure 3:
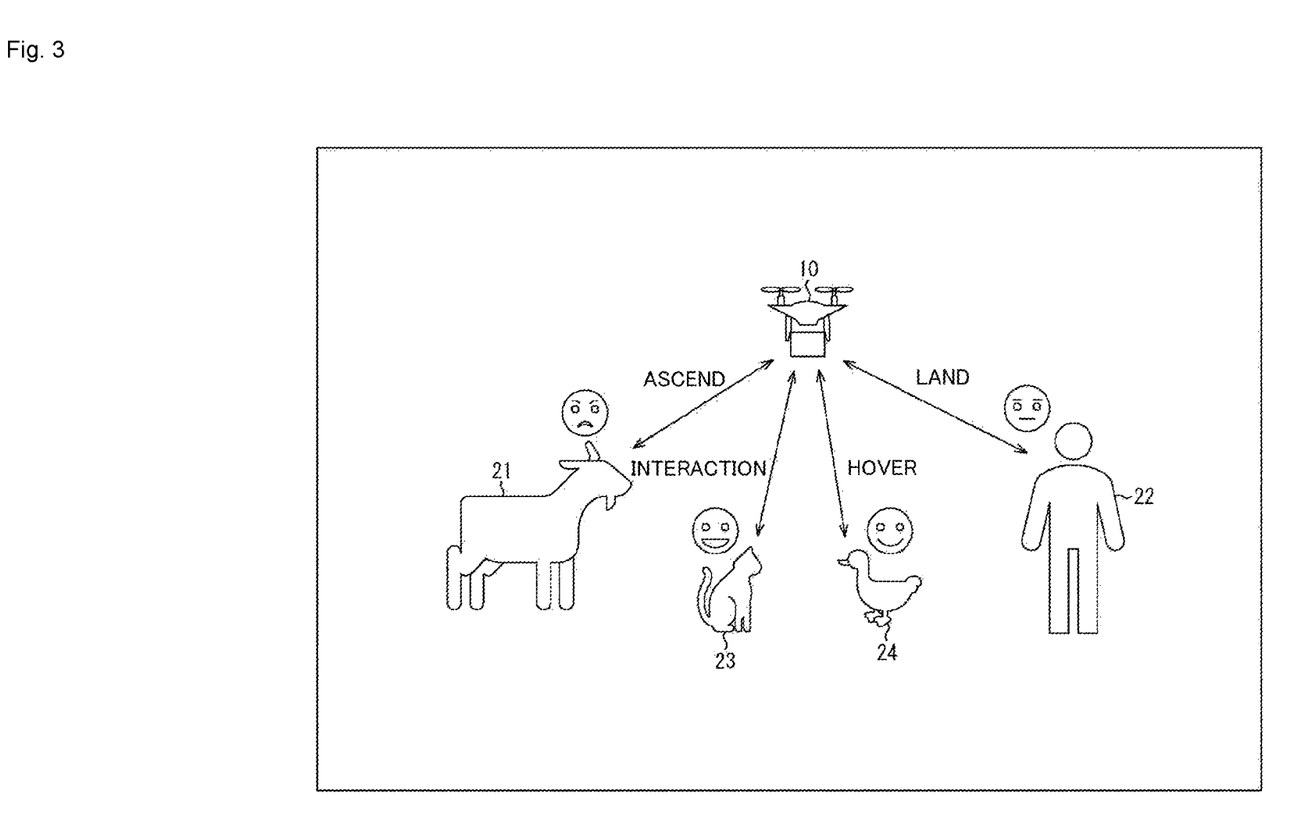
FIG. 3 is a diagram illustrating an overview of a technique according to the present disclosure.

For example, as illustrated in FIG. 3, if the drone 10 estimates that an animal 21 is in a state in which the animal 21 will attack the drone 10, the drone 10 determines to ascend to a predetermined altitude position.

Additionally, if the drone 10 estimates that the state of a person 22 is that the person 22 is interfering with the flight of the drone 10, such as trying to capture the drone 10, the drone 10 determines to land.

Furthermore, if the drone 10 estimates that the state of an animal 23 is such that interaction, such as capturing an image at close range, is possible, the drone 10 determines to perform that interaction.

Additionally, if the drone 10 estimates that the state of an animal 24 is in a state that does not require any action by the drone 10, the drone 10 determines to hover to keep its current position in the air.

2. Configuration of Drone (Configuration Blocks of Drone)

Figure 4:
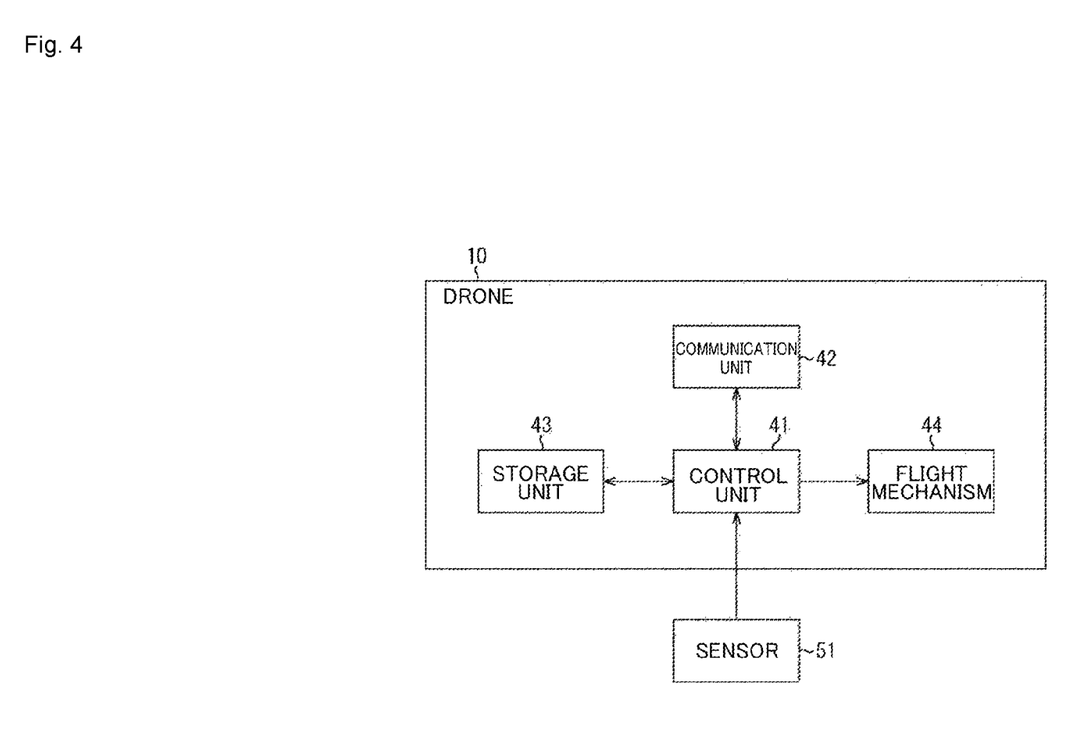
FIG. 4 is a block diagram illustrating an example of the configuration of a drone.

FIG. 4 is a block diagram of illustrating an example the configuration of the drone 10 in which the technique of the present disclosure is applied.

The drone 10 includes a control unit 41, a communication unit 42, a storage unit 43, and a flight mechanism 44. The drone 10 is also provided with a sensor 51.

The control unit 41 is constituted by a processor such as a Central Processing Unit (CPU), memory, and the like, and controls the communication unit 42, the storage unit 43, the flight mechanism 44, and the sensor 51 by executing a predetermined program. For example, the control unit 41 controls the flight mechanism 44 on the basis of information stored in the storage unit 43, sensor data collected by the sensor 51, and the like.

The communication unit 42 is constituted by a network interface or the like, and performs wireless or wired communication with a controller that provides instructions to the drone 10, other desired devices, and the like. For example, the communication unit 42 may communicate directly with a device serving as a communication partner, or may perform network communication via a base station, relay device, or the like using Wi-Fi (registered trademark), 4G, 5G, or the like.

The storage unit 43 is constituted by non-volatile memory such as flash memory, and stores various types of information under the control of the control unit 41. For example, the storage unit 43 stores (holds) three-dimensional map information, which will be described later.

The flight mechanism 44 is a mechanism for enabling the drone 10 to fly, and is constituted by a propeller, a motor that rotates the propeller, and the like. The flight mechanism 44 is driven under the control of the control unit 41, which enables the drone 10 to fly.

The sensor 51 is constituted by, for example, a depth sensor such as a camera, a stereo camera, ToF (Time of Flight) sensor, or the like, as well as sonar, radar, LiDER, or the like. The sensor 51 may also be configured to include a tactile sensor that detects external pressure, impact forces, or the like, an Inertial Measurement Unit (IMU) sensor, a Global Positioning System (GPS) sensor, or the like. The sensor data collected by the sensor 51 is used to control the flight of the drone 10.

(Functional Configuration Blocks of Control Unit)

Figure 5:
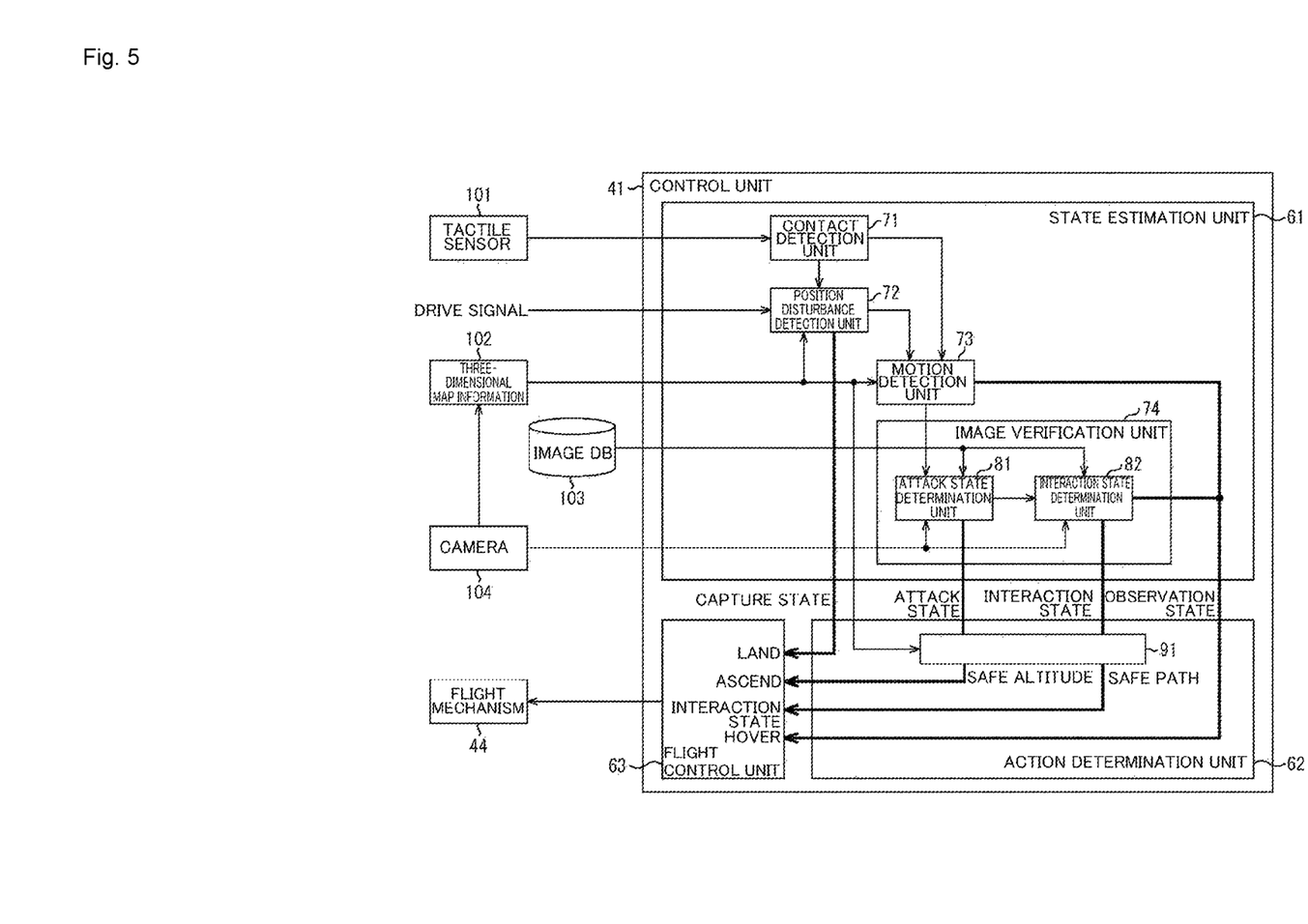
FIG. 5 is a block diagram illustrating an example of the functional configuration of a control unit.

FIG. 5 is a block diagram illustrating an example of the functional configuration of the control unit 41.

The function blocks of the control unit 41 illustrated in FIG. 5 are realized by the execution of a predetermined program by the processor that constitutes the control unit 41.

The control unit 41 is constituted by a state estimation unit 61, an action determination unit 62, and a flight control unit 63.

The state estimation unit 61 estimates the state of the recognition target, which is the target of interaction, on the basis of various types of input information.

The input information includes at least one of sensor data from a tactile sensor 101, a drive signal of the motor constituting the flight mechanism 44, three-dimensional map information 102, images stored in an image database (DB) 103, and camera images shot by a camera 104.

The tactile sensor 101 senses external pressure, impact forces, or the like.

Figure 6A:
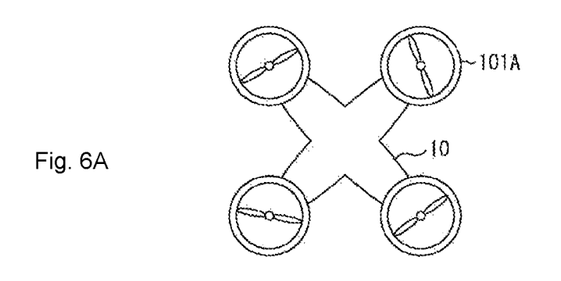
FIGS. 6A and 6B are diagrams illustrating an example of a tactile sensor.

For example, the tactile sensor 101 is configured as a pressure sensor 101A provided in a propeller guard that protects the propeller of the drone 10, as illustrated in FIG.

6A. According to the pressure sensor 101A, a collision between the drone 10 and an external object, a recognition target, or the like can be detected.

Figure 6B:
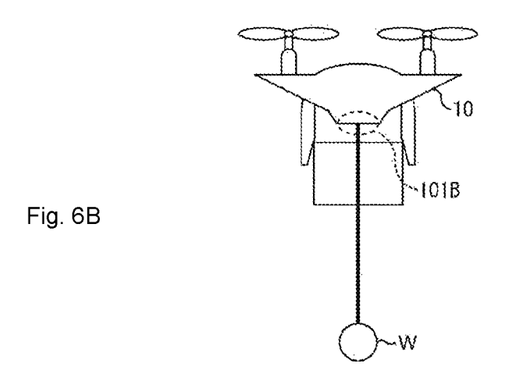

The tactile sensor 101 may be configured as a load cell 101B that detects the tensile force from below the drone 10, as illustrated in FIG. 6B. A weight W is suspended from the load cell 101B. The drone 10 being captured by the recognition target can be detected in response to the weight W being pulled by the recognition target.

The three-dimensional map information 102 is map information that integrates a own position estimated by the IMU sensor, the GPS sensor, or the like, an obstruction map generated through Simultaneous Localization and Mapping (SLAM), semantic information detected by object detection, object movement directions estimated through object tracking, and the like. SLAM, object detection, and the like are performed using images from the camera 104. The three-dimensional map information 102 is stored in the storage unit 43.

The image DB 103 stores labeled images to which labels corresponding to states of the recognition targets have been added in advance. The image DB 103 may be provided inside the drone 10, or may be provided outside and connected to the drone 10 via the communication unit 42.

The camera 104 shoots images of the surrounding environment of the drone 10, the recognition target, and the like. The camera image in which the recognition target is shot is verified against the labeled images stored in the image DB 103.

The state estimation unit 61 includes a contact detection unit 71, a position disturbance detection unit 72, a motion detection unit 73, and an image verification unit 74.

On the basis of the sensor data from the tactile sensor 101, the contact detection unit 71 detects contact with the recognition target when an external pressure, impact force, or the like exceeds a predetermined value.

The position disturbance detection unit 72 detects a disturbance in the own position when the position of the drone 10 estimated by inferring movement of the drone 10 on the basis of the drive signal of the motor is greater than or equal to a predetermined distance from the own position in the three-dimensional map information 102, estimated by the IMU sensor, the GPS sensor, or the like. In this case, the position disturbance detection unit 72 supplies, to the action determination unit 62, state information indicating that the state of the recognition target is a captured state in which the drone 10 itself has been captured.

The motion detection unit 73 detects motion of the recognition target on the basis of the position and velocity of the recognition target in the three-dimensional map information 102 and the position of the recognition target relative to the drone 10. If no motion of the recognition target is detected, the position disturbance detection unit 72 supplies, to the action determination unit 62, state information indicating that the state of the recognition target is an observation state that does not require any action from the drone 10 itself.

The image verification unit 74 determines the state of the recognition target by verifying the camera image in which the recognition target whose motion has been detected was shot against the labeled images stored in the image DB 103.

The image verification unit 74 includes an attack state determination unit 81 and an interaction state determination unit 82.

The attack state determination unit 81 determines whether or not the camera image matches a labeled image, among the labeled images stored in the image DB 103, that corresponds to an attack state in which the drone 10 itself may be attacked. When the camera image is matched with a labeled image corresponding to the attack state, state information indicating that the state of the recognition target is the attack state is supplied to the action determination unit 62.

If the camera image does not match the labeled image corresponding to the attack state, the interaction state determination unit 82 determines whether or not the camera image matches a labeled image, among the labeled images stored in the image DB 103, that corresponds to an interaction state in which the drone 10 itself can interact. When the camera image is matched with a labeled image corresponding to the interaction state, state information indicating that the recognition target is in the interaction state is supplied to the action determination unit 62. On the other hand, when the camera image is not matched with a labeled image corresponding to the interaction state, state information indicating that the state of the recognition target is the observation state is supplied to the action determination unit 62.

The action determination unit 62 determines the action of the drone 10 according to the state information from each unit in the state estimation unit 61. Action information expressing the determined action is supplied to the flight control unit 63.

For example, when the state information indicating that the recognition target is in the captured state is supplied from the state estimation unit 61, the action determination unit 62 determines to land as the action of the drone 10, and supplies action information to that effect to the flight control unit 63.

Additionally, when the state information indicating that the recognition target is in the observation state is supplied from the state estimation unit 61, the action determination unit 62 determines to hover as the action of the drone 10, and supplies action information to that effect to the flight control unit 63.

The action determination unit 62 includes a safe area estimation unit 91.

The safe area estimation unit 91 estimates a safe area where the drone 10 can perform actions safely on the basis of the three-dimensional map information 102 when the state information indicating that the recognition target is in the attack state or the interaction state is supplied from the state estimation unit 61.

Specifically, when the state information indicating that the recognition target is in the attack state is supplied from the state estimation unit 61, the safe area estimation unit 91 estimates a safe altitude, which is a safe altitude position. In this case, the action determination unit 62 determines to ascend to the safe altitude estimated by the safe area estimation unit 91 as the action of the drone 10, and supplies action information to that effect to the flight control unit 63.

Additionally, when the state information indicating that the recognition target is in the interaction state is supplied from the state estimation unit 61, the safe area estimation unit 91 estimates a safe path, which is a path that is safe. In this case, the action determination unit 62 determines to fly along the safe path estimated by the safe area estimation unit 91 and interact with the recognition target as the action of the drone 10, and supplies action information to that effect to the flight control unit 63.

The flight control unit 63 controls the flight mechanism 44 on the basis of the action information expressing the action of the drone 10 determined by the action determination unit 62.

The flight of the drone 10 is controlled through the configuration described thus far.

3. Flight Control of Drone

The flow of flight control of the drone 10 having the above-described configuration will be described hereinafter.

Figure 7:
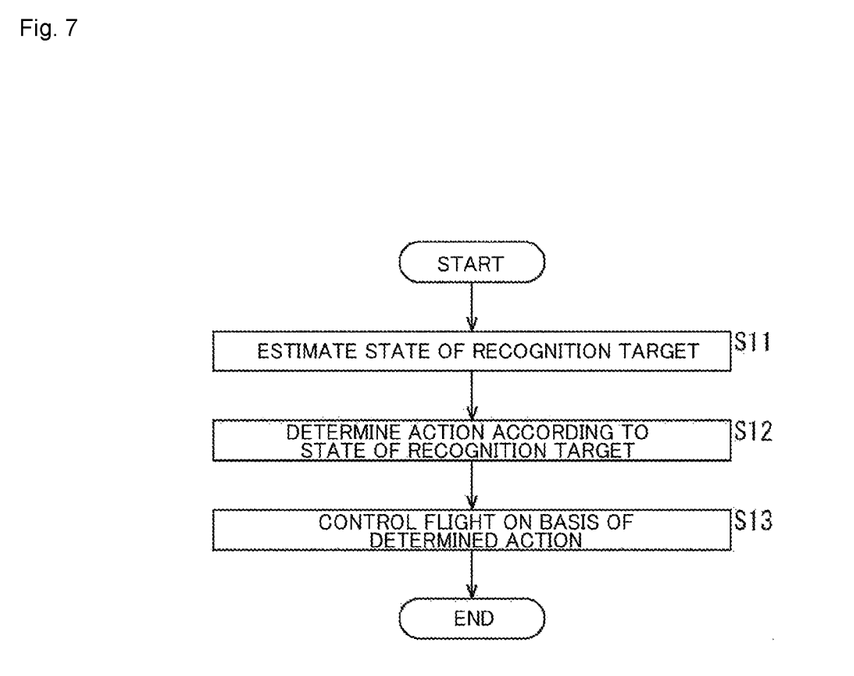
FIG. 7 is a flowchart illustrating the flow of flight control processing for a drone.

FIG. 7 is a flowchart illustrating the flow of flight control for the drone 10. The processing illustrated in FIG. 7 is started, for example, by an instruction to interact with the recognition target during the flight of the drone 10.

In step S11, the state estimation unit 61 estimates the state of the recognition target by executing state estimation processing for the recognition target.

In step S12, the action determination unit 62 determines the action of the drone 10 by executing action determination processing according to the estimated state of the recognition target.

In step S13, the flight control unit 63 controls the flight of the drone 10 on the basis of the determined action.

(3-1. State Estimation of Recognition Target)

Figure 8:
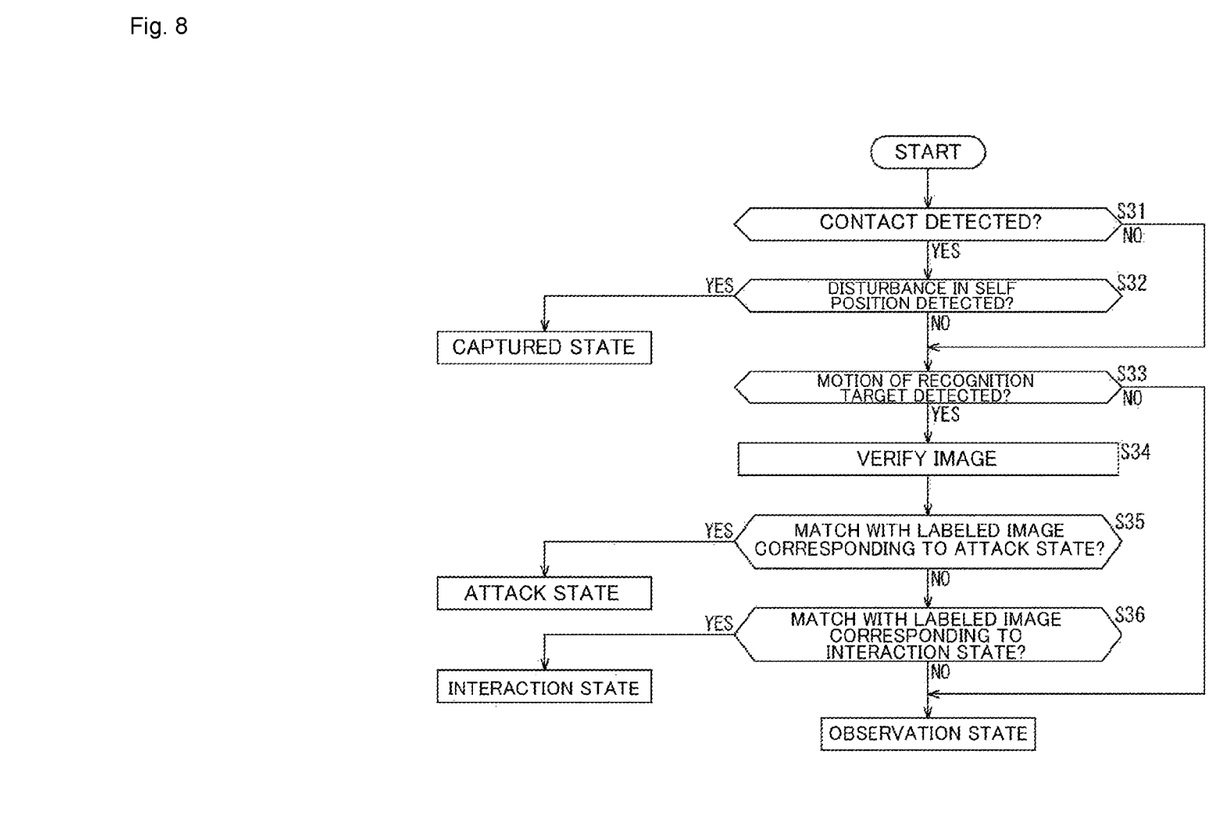
FIG. 8 is a flowchart illustrating the flow of state estimation processing for a recognition target.

The flow of the state estimation processing for the recognition target, executed in step S11 of FIG. 7, will be described here with reference to the flowchart in FIG. 8.

In step S31, the contact detection unit 71 determines whether or not contact with the recognition target has been detected on the basis of the sensor data from the tactile sensor 101.

The processing moves to step S32 if it is determined that contact has been detected in step S31.

In step S32, the position disturbance detection unit 72 determines whether or not a disturbance in the own position has been detected on the basis of the drive signal of the motor.

If it is determined in step S32 that a disturbance in the own position is detected, the state estimation unit 61 estimates that the state of the recognition target is the captured state in which the drone 10 itself is captured. The state information indicating the captured state is supplied to the action determination unit 62.

On the other hand, if it is determined in step S32 that no disturbance in the own position has been detected, the processing moves to step S33.

Additionally, if it is determined that no contact has been detected in step S31, step S32 is skipped, and the processing moves to step S33.

Note that in the drone 10, the tactile sensor 101 is not a required constituent element, and the tactile sensor 101 may be omitted. In this case, the state estimation processing for the recognition target starts from step S32.

In step S33, the motion detection unit 73 determines whether or not motion of the recognition target has been detected on the basis of the three-dimensional map information 102.

If it is determined in step S33 that no motion of the recognition target has been detected, the state estimation unit 61 estimates that the state of the recognition target is the observation state, in which the drone 10 is not required to take any action. The state information indicating the observation state is supplied to the action determination unit 62.

On the other hand, the processing moves to step S34 if it is determined that motion of the recognition target has been detected in step S33.

In step S34, the image verification unit 74 verifies the camera image in which the recognition target whose motion has been detected was shot against the labeled images stored in the image DB 103.

Specifically, in step S35, the attack state determination unit 81 determines whether or not the camera image matches a labeled image that corresponds to an attack state in which the drone 10 itself may be attacked.

Figure 9:
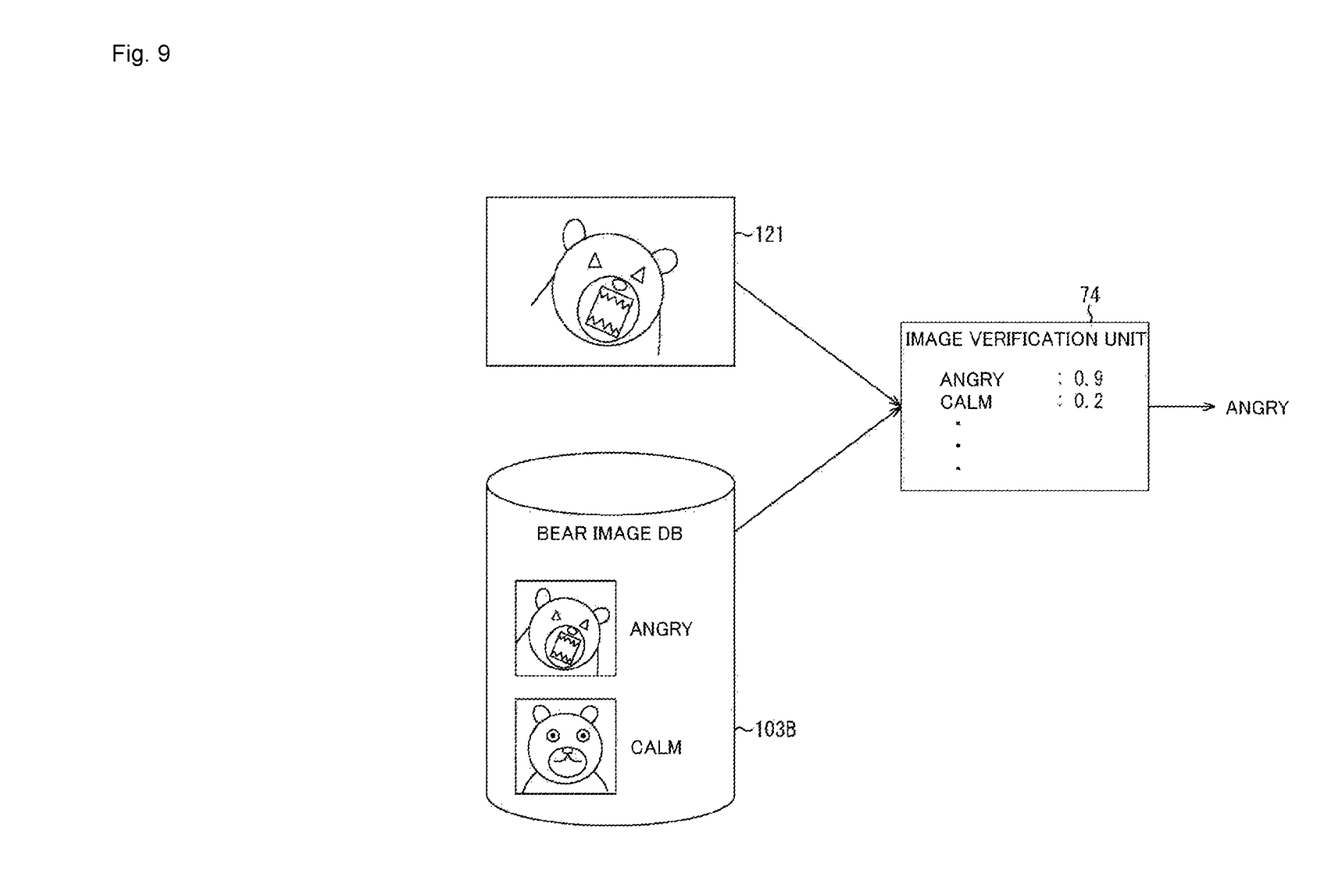
FIG. 9 is a diagram illustrating image verification.

For example, assume that a camera image 121 of a bear, which serves as the recognition target, is input to the image verification unit 74, as illustrated in FIG. 9.

In this case, the image verification unit 74 (the attack state determination unit 81) matches the camera image 121 with a labeled bear image stored in a bear image DB 103B, which is one image DB 103. In the example in FIG. 9, a labeled bear image having a label "angry", which corresponds to the attack state, and a labeled image having a label "calm", which corresponds to the interaction state, are stored in the bear image DB 103B.

Furthermore, in the example in FIG. 9, a matching result between the camera image 121 and the labeled bear image is indicated as a numerical value in the image verification unit 74. Specifically, a matching result with the labeled bear image having the label "angry" is indicated as 0.9, and a matching result with the labeled bear image having the label "calm" is indicated as 0.2.

In this case, the camera image 121 is determined to be the best match with the labeled bear image having the label "angry".

In this manner, if it is determined in step S35 that the camera image matches the labeled image corresponding to the attack state, the state estimation unit 61 estimates that the state of the recognition target is the attack state. The state information indicating the attack state is supplied to the action determination unit 62.

On the other hand, if it is determined in step S35 that the camera image does not match the labeled image corresponding to the attack state, the processing moves to step S36.

In step S36, the interaction state determination unit 82 determines whether or not the camera image matches a labeled image corresponding to the interaction state in which the drone 10 itself is capable of interaction.

If it is determined in step S36 that the camera image matches a labeled image corresponding to the interaction state, the state estimation unit 61 estimates that the state of the recognition target is the interaction state. The state information indicating the interaction state is supplied to the action determination unit 62.

On the other hand, if it is determined in step S36 that the camera image does not match a labeled image corresponding to the interaction state, the state estimation unit 61 estimates that the state of the recognition target is the observation state. The state information indicating the observation state is supplied to the action determination unit 62.

The state of the recognition target is estimated in this manner.

(3-2. Action Determination)

Figure 10:
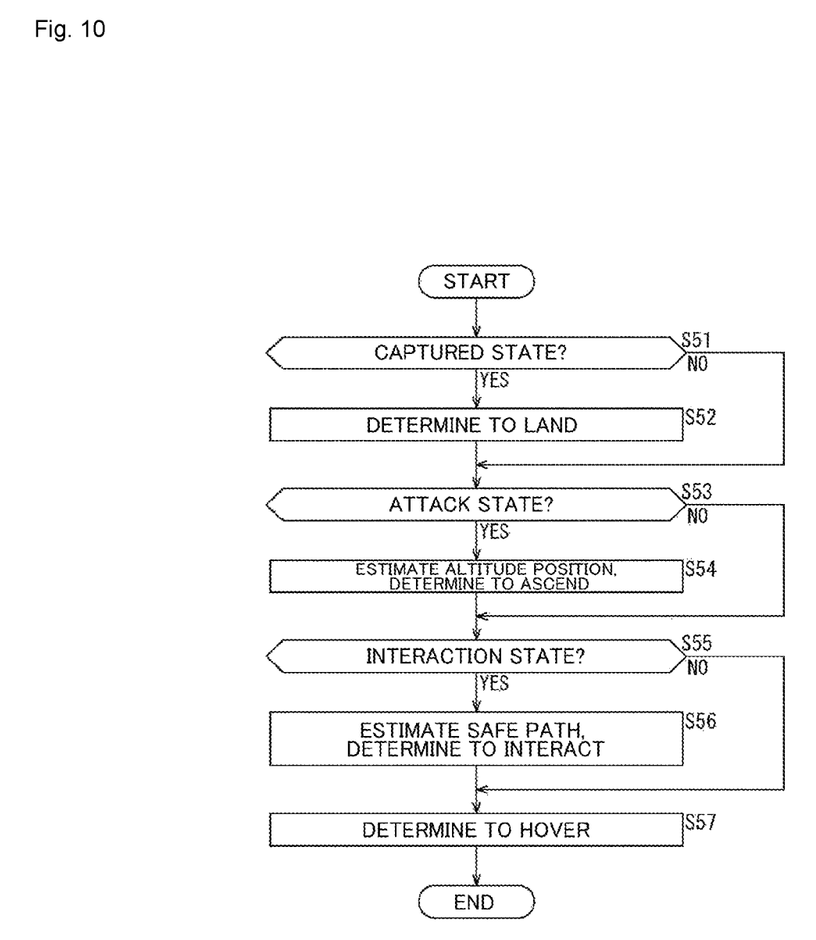
FIG. 10 is a flowchart illustrating the flow of action determination processing for a drone.

The flow of the action determination processing executed in step S12 of FIG. 7 will be described next with reference to the flowchart in FIG. 10.

In step S51, the action determination unit 62 determines whether or not the state of the recognition target is the captured state on the basis of the state information from the state estimation unit 61.

If the state of the recognition target is determined to be the captured state in step S51, the processing moves to step S52.

In step S52, the action determination unit 62 determines to land as the action of the drone 10. In this case, the flight control unit 63 causes the drone 10 to land by controlling the flight mechanism 44.

On the other hand, if the state of the recognition target is determined not to be the captured state in step S51, step S52 is skipped, and the processing moves to step S53.

In step S53, the action determination unit 62 determines whether or not the state of the recognition target is the attack state on the basis of the state information from the state estimation unit 61.

If the state of the recognition target is determined to be the attack state in step S53, the processing moves to step S54.

In step S54, the safe area estimation unit 91 estimates the safe altitude, which is a safe altitude position, and the action determination unit 62 determines to ascend to the safe altitude as the action of the drone 10. In this case, the flight control unit 63 causes the drone 10 to ascend to the safe altitude by controlling the flight mechanism 44.

On the other hand, if the state of the recognition target is determined not to be the attack state in step S53, step S54 is skipped, and the processing moves to step S55.

In step S55, the action determination unit 62 determines whether or not the state of the recognition target is the interaction state on the basis of the state information from the state estimation unit 61.

If the state of the recognition target is determined to be the interaction state in step S55, the processing moves to step S56.

In step S56, the safe area estimation unit 91 estimates the safe path, which is a path that is safe, and the action determination unit 62 determines to fly along the safe path and interact with the recognition target as the action of the drone 10. In this case, the flight control unit 63 causes the drone 10 to fly along the safe path by controlling the flight mechanism 44.

On the other hand, if the state of the recognition target is determined not to be the interaction state in step S55, i.e., if the state of the recognition target is the observation state, the processing moves to step S57.

In step S57, the action determination unit 62 determines to hover as the action of the drone 10. In this case, the flight control unit 63 causes the drone 10 to hover by controlling the flight mechanism 44.

The action of the drone 10 is determined as described above.

According to the processing described above, the state of the recognition target is estimated, and the action of the drone 10 is determined according to the estimated state of the recognition target, which makes it possible to safely interact with the recognition target.

For example, if a wild animal serving as the recognition target is estimated to be in a state in which interaction is possible, such as being in a good mood, adopting a given posture or facial expression, or the like, the drone 10 can interact with the wild animal at close range while flying along a safe path.

On the other hand, if the wild animal serving as the recognition target is estimated to be angry and in a state ready to attack the drone 10, the drone 10 can ascend to a safe altitude position where the drone 10 will not be attacked by the wild animal.

Furthermore, if the wild animal serving as the recognition target is estimated to be in a state of having captured the drone 10, the drone 10 can land on the spot to avoid damage to the drone 10 by flying unnecessarily.

Additionally, if the wild animal serving as the recognition target is estimated to be in a state where interaction is not even necessary, such as being asleep, the drone 10 can hover in place and wait for the next action of the recognition target.

Although the state of the recognition target is assumed to be estimated as being one of four states, namely the captured state, the attack state, the interaction state, and the observation state in the foregoing, it should be noted that at least one of the four states may be estimated, or to other states that are further defined may be estimated.

The technique according to the present embodiment is not limited to the above-mentioned filming of wild animals, close-range filming of players playing sports, and the like, and can also be applied in human-robot interaction between humans and robots, animal-robot interaction between animals and robots, and the like.

In human-robot interaction, for example, a drone provided with an umbrella in an open state can track and fly over a person's head while avoiding crowds, surrounding buildings, and the like.

Additionally, in animal-robot interaction, for example, a drone provided with a syringe can properly inject a fierce animal such as a tiger or a lion with anesthesia.

The series of processing described above can be executed by hardware or software. In the case where the series of processes is executed by software, a program that configures the software is installed on a computer. Here, the computer includes, for example, a computer built in dedicated hardware, a general-purpose personal computer in which various programs are installed to be able to execute various types of functions, and the like.

In the computer, the above-described series of processing is performed by the control unit 41 loading and executing programs stored in the storage unit 43.

The program executed by the computer (control unit 41) can be recorded on, for example, a removable medium as a package medium or the like and provided in such a manner. The program can be supplied via a wired or wireless transfer medium such as a local area network, the Internet, or digital satellite broadcasting.

In the computer, by mounting the removable medium on a drive, it is possible to install the program in the storage unit 43. The program can also be received via a wired or wireless transfer medium to be installed in the storage unit 43.

The program executed by the computer may be a program that performs processing chronologically in the procedure described in the present specification or may be a program that performs processing at a necessary timing such as in parallel or upon being called.

In the present specification, the steps describing a program recorded on a recording medium include not only processing that is performed chronologically in the order described, but also processing that is performed in parallel or individually, without necessarily being processed chronologically.

Embodiments of the technique according to the present disclosure are not limited to the above-described embodiments, and various modifications can be made without departing from the essential spirit of the technique according to the present disclosure.

The effects described in the present specification are merely illustrative and not limiting, and other effects may be obtained.

Furthermore, the technique according to the present disclosure can be configured as follows.

(1)

A crewless aircraft including:
 a state estimation unit that, on the basis of at least one of a camera image shot of a recognition target by a camera or a drive signal of a motor for flying, estimates a state of the recognition target; and
 an action determination unit that determines an action of an own aircraft according to the state of the recognition target estimated.

(2)
The crewless aircraft according to (1),
wherein the state estimation unit estimates the state of the recognition target as being at least one of the following:
a first state of interference with flight of the own aircraft;
a second state where there is a possibility of attacking the own aircraft;
a third state where a predetermined interaction of the own aircraft is possible; and
a fourth state in which none of an action by the own aircraft is needed.

(3)
The crewless aircraft according to (2),
wherein, when the recognition target is estimated to be in the second state or the third state, the action determination unit estimates, on the basis of three-dimensional map information, a safe area where the own aircraft can take action safely.

(4)
The crewless aircraft according to (3),
wherein, when the recognition target is estimated to be in the second state, the action determination unit determines, as the action of the own aircraft, to ascend to an altitude position where the own aircraft can take action safely.

(5)
The crewless aircraft according to (3) or (4),
wherein, when the recognition target is estimated to be in the third state, the action determination unit determines, as the action of the own aircraft, to fly along a path where the own aircraft can take action safely, and to execute the interaction.

(6)
The crewless aircraft according to any one of (2) to (5),
wherein, when the recognition target is estimated to be in the first state, the action determination unit determines, as the action of the own aircraft, to land.

(7)
The crewless aircraft according to any one of (2) to (6),
wherein, when the recognition target is estimated to be in the fourth state, the action determination unit determines, as the action of the own aircraft, to hover.

(8)
The crewless aircraft according to any one of (2) to (7),
wherein the state estimation unit estimates the state of the recognition target by verifying the camera image against a labeled image given a label corresponding to the state of the recognition target in advance.

(9)
The crewless aircraft according to (8),
wherein the state estimation unit estimates that the recognition target is in the second state or the third state by verifying the camera image against the labeled image corresponding to the second state or the third state.

(10)
The crewless aircraft according to (8) or (9),
wherein the state estimation unit estimates that the recognition target is in the fourth state when a result of the verifying indicates that the camera image does not match the labeled image corresponding to the second state or the third state.

(11)
The crewless aircraft according to any one of (8) to (10),
wherein the state estimation unit estimates the state of the recognition target by detecting motion of the recognition target on the basis of three-dimensional map information.

(12)
The crewless aircraft according to (11),
wherein the state estimation unit estimates the state of the recognition target by verifying the camera image against the labeled image when motion of the recognition target is detected.

(13)
The crewless aircraft according to (11) or (12),
wherein the state estimation unit estimates that the recognition target is in the fourth state when motion of the recognition target is not detected.

(14)
The crewless aircraft according to any one of (8) to (13),
wherein the state estimation unit estimates the state of the recognition target by detecting a difference between a position of the own aircraft based on the drive signal of the motor and an own position estimation result.

(15)
The crewless aircraft according to (14),
wherein when the difference between the position of the own aircraft and the own position estimation result is smaller than a predetermined distance, the state estimation unit estimates the state of the recognition target by detecting motion of the recognition target on the basis of three-dimensional map information.

(16)
The crewless aircraft according to (14) or (15),
wherein the state estimation unit estimates that the recognition target is in the first state when the difference between the position of the own aircraft and the own position estimation result is greater than a predetermined distance.

(17)
A control method including:
a crewless aircraft estimating, on the basis of at least one of a camera image shot of a recognition target by a camera or a drive signal of a motor for flying, a state of the recognition target; and
the crewless aircraft determining an action of an own aircraft according to the state of the recognition target estimated.

(18)
A program for causing a computer to execute processing of:
estimating, on the basis of at least one of a camera image shot of a recognition target by a camera or a drive signal of a motor for flying, a state of the recognition target; and
determining an action of a crewless aircraft according to the state of the recognition target estimated.

REFERENCE SIGNS LIST

10 Drone
41 Control unit
42 Communication unit
43 Storage unit
44 Flight mechanism
51 Sensor
61 State estimation unit
62 Action determination unit
63 Flight control unit

The invention claimed is:

1. A crewless aircraft, comprising:
a state estimation unit configured to, based on at least one of a camera image shot of a recognition target by a camera or a drive signal of a motor for a flying operation, estimate a state of the recognition target as at least one of:
  a first state of interference with flight of the crewless aircraft
  a second state where there is a possibility of attack to the crewless aircraft,
  a third state where a specific interaction of the crewless aircraft is possible, or
  a fourth state in which no action by the crewless aircraft is needed; and
an action determination unit configured to determine an action of the crewless aircraft based on the estimated state of the recognition target.

2. The crewless aircraft according to claim 1,
wherein, in a case where the recognition target is estimated to be in one of the second state or the third state, the action determination unit is further configured to estimate, based on three-dimensional map information, a safe area where an execution of the action by the crewless aircraft is safe.

3. The crewless aircraft according to claim 2,
wherein, in a case where the recognition target is estimated to be in the second state, the action determination unit is further configured to determine, as the action of the crewless aircraft, to ascend to an altitude position where the execution of the action by the crewless aircraft is safe.

4. The crewless aircraft according to claim 2,
wherein, in a case where the recognition target is estimated to be in the third state, the action determination unit is further configured to determine, as the action of the crewless aircraft, to fly along a path where the execution of the action by the crewless aircraft is safe, and to execute the specific interaction.

5. The crewless aircraft according to claim 1,
wherein, in a case where the recognition target is estimated to be in the first state, the action determination unit is further configured to determine, as the action of the crewless aircraft, to land.

6. The crewless aircraft according to claim 1,
wherein, in a case where the recognition target is estimated to be in the fourth state, the action determination unit is further configured to determine, as the action of the crewless aircraft, to hover.

7. The crewless aircraft according to claim 1, wherein the state estimation unit is further configured to:
verify the camera image against a labeled image that corresponds to the state of the recognition target; and
estimate the state of the recognition target based on the verification of the camera image against the labeled image.

8. The crewless aircraft according to claim 7,
wherein the state estimation unit is further configured to estimate that the recognition target is in one of the second state or the third state based on the verification of the camera image against the labeled image corresponding to one of the second state or the third state.

9. The crewless aircraft according to claim 7,
wherein the state estimation unit is further configured to estimate that the recognition target is in the fourth state in a case where a result of the verification indicates that the camera image does not match the labeled image corresponding to one of the second state or the third state.

10. The crewless aircraft according to claim 7, wherein the state estimation unit is further configured to:
detect motion of the recognition target based on three-dimensional map information, and
estimate the state of the recognition target based on the detection of the motion of the recognition target.

11. The crewless aircraft according to claim 10,
wherein the verification of the camera image against the labeled image is based on the detection of the motion of the recognition target.

12. The crewless aircraft according to claim 10,
wherein the state estimation unit is further configured to estimate that the recognition target is in the fourth state in a case where the motion of the recognition target is not detected.

13. The crewless aircraft according to claim 7, wherein the state estimation unit is further configured to:
detect a difference between a position of the crewless aircraft based on the drive signal of the motor and an own position estimation result; and
estimate the state of the recognition target based on the detection of the difference between the position of the crewless aircraft.

14. The crewless aircraft according to claim 13,
wherein, in a case where the difference between the position of the crewless aircraft and the own position estimation result is smaller than a specific distance, the state estimation unit is further configured to:
detect motion of the recognition target based on three-dimensional map information; and
estimate the state of the recognition target based on the detection of the motion of the recognition target.

15. The crewless aircraft according to claim 13,
wherein the state estimation unit is further configured to estimate that the recognition target is in the first state in a case where the difference between the position of the crewless aircraft and the own position estimation result is greater than a specific distance.

16. A control method, comprising:
in a crewless aircraft:
estimating, based on at least one of a camera image shot of a recognition target by a camera or a drive signal of a motor for a flying operation, a state of the recognition target as at least one of:
  a first state of interference with flight of the crewless aircraft,
  a second state where there is a possibility of attack to the crewless aircraft,
  a third state where a specific interaction of the crewless aircraft is possible, or
  a fourth state in which no action by the crewless aircraft is needed; and
determining an action of the crewless aircraft based on the estimated state of the recognition target.

17. A non-transitory computer-readable medium having stored thereon, computer-executable instructions, which when executed by a processor in a crewless aircraft, cause the processor to execute operations, the operations comprising:
estimating, based on at least one of a camera image shot of a recognition target by a camera or a drive signal of a motor for a flying operation, a state of the recognition target as at least one of:

a first state of interference with flight of the crewless aircraft, a second state where there is a possibility of attack to the crewless aircraft, a third state where a specific interaction of the crewless aircraft is possible, or a fourth state in which no action by the crewless aircraft is needed; and determining an action of the crewless aircraft based on the estimated state of the recognition target.

* * * * *